(12) United States Patent
Ono et al.

(10) Patent No.: US 7,489,482 B2
(45) Date of Patent: Feb. 10, 2009

(54) MAGNETIC HEAD OF MAGNETORESISTANCE EFFECT TYPE AND PROCESS FOR PRODUCTION THEREOF

(75) Inventors: Hiroyuki Ono, Kanagawa (JP); Hiroaki Suzuki, Tokyo (JP); Toshio Sunaga, Shiga (JP); Hisatada Miyatake, Shiga (JP); Hideo Asano, Tokyo (JP)

(73) Assignee: Hitachi GLobal Storage Technologies Netherlands B.V., Amsterdam (NL)

( * ) Notice: Subject to any disclaimer, the term of this patent is extended or adjusted under 35 U.S.C. 154(b) by 433 days.

(21) Appl. No.: 11/009,773

(22) Filed: Dec. 10, 2004

(65) Prior Publication Data
US 2005/0141143 A1  Jun. 30, 2005

(30) Foreign Application Priority Data
Dec. 26, 2003 (JP) ............................. 2003-432646

(51) Int. Cl.
*G11B 5/39* (2006.01)
(52) U.S. Cl. ...................................................... 360/323
(58) Field of Classification Search ............... 360/324.2
See application file for complete search history.

(56) References Cited

U.S. PATENT DOCUMENTS 6,577,476 B1* 6/2003 Childress et al. ....... 360/324.11
6,710,983 B2* 3/2004 Voldman .................... 360/323
2003/0214763 A1* 11/2003 Childress et al. ......... 360/324.2

FOREIGN PATENT DOCUMENTS

JP  2000-358608  12/2002

* cited by examiner

*Primary Examiner*—Mark Blouin
(74) *Attorney, Agent, or Firm*—Townsend and Townsend and Crew LLP; Darren Gold

(57) ABSTRACT

In the case of magnetic head of magnetoresistance effect type whose breakdown voltage is as low as 0.3 V, it is impractical to ignore even a very small amount of static electricity that occurs during fabrication or use. In one embodiment, the desired magnetic head is produced by forming an $SiO_2$ layer on a silicon slider, thereby forming an SOI substrate; forming on the SOI substrate circuits to protect a TMR element from overvoltage and a read-write circuit; forming field effect transistors from an Si semiconductor layer (formed by reduction of the $SiO_2$ layer or epitaxial growth on the $SiO_2$ layer); forming three electrodes (source, gate, drain) on the Si semiconductor layer; forming a Schottky diode by Schottky contact (metal) with the Si semiconductor layer; forming overvoltage protective circuits of aluminum wiring on the SOI substrate; and forming a TMR element.

23 Claims, 5 Drawing Sheets

US 7,489,482 B2

MAGNETIC HEAD OF MAGNETORESISTANCE EFFECT TYPE AND PROCESS FOR PRODUCTION THEREOF

CROSS-REFERENCES TO RELATED APPLICATIONS

This application claims priority from Japanese Patent Application No. JP 2003-432646, filed Dec. 26, 2003, the entire disclosure of which is incorporated herein by reference.

BACKGROUND OF THE INVENTION

The present invention relates to a magnetic head of magnetoresistance effect type to be used for a magnetic disk drive and a process for production thereof. More-particularly, the present invention relates to a magnetic head of magnetoresistance effect type which includes a magnetoresistive element and an overvoltage protective circuit arranged together on a slider, and to a process for production thereof.

A magnetic disk drive is usually provided with a magnetic head of magnetoresistance effect type which is a magnetoresistive element (such as MR element, MGR element, and TMR element). Unfortunately, the magnetoresistive element is easily broken on account of its low withstand voltage. Existing GMR (Giant Magnetoresistive) heads are broken at about 0.5 V and promising TMR (Tunneling Magnetoresistive) heads are broken at about 0.3 V. In other words, TMR heads are subject to electro-static destruction (ESD) resulting from static electricity (hundreds of mV) which occurs during fabrication or within the magnetic disk drive.

A usual measure to cope with this situation is to connect a diode clamp circuit to the input of the preamplifier of the MR element. This diode clamp circuit prevents a voltage higher than 0.6 V from being applied across both terminals of the MR element or across the MR element and the ground after the wired components have been incorporated into the head stack assembly (HSA). The 0.6 V is the voltage drop (Vf) that occurs in the forward direction of the diode.

Japanese Patent Laid-open No. 2002-358608 (pp. 4-5, FIG. 1) discloses a technology relating to protection from overvoltage. This technology is designed to protect the magnetic head from disturbing noise which might come in during fabrication, while keeping both high recording density and high response speed. The object is achieved in the following manner. A silicon layer held between insulating films is formed on the substrate. On this silicon layer are formed at least one diode clamp circuit and a recording-reading amplifier circuit. The clamp circuit electrically connects any two members selected from the first shield, the second shield, the first electrode, and the second electrode with each other, all of which constitute the magnetoresistive element, and the substrate.

BRIEF SUMMARY OF THE INVENTION

In the case of TMR element whose breakdown voltage is as low as 0.3 V, it is impractical to ignore even a very small amount of static electricity that occurs during fabrication before the TMR element is incorporated into the HSA. It has been common practice to set the protecting voltage at 0.6 V for the TMR element incorporated into the HSA. This voltage, however, is too high. Moreover, the conventional clamp circuit is constructed such that clamping is performed by the diode in the electric circuit after current has passed through the inductance inherent to the wire connecting the TMR element and the preamplifier together. The disadvantage of this construction is that the actual clamping voltage increases by the product of inductance and current (due to static electricity). The invention disclosed in JP 2002-358608 mentioned above merely provides a protective circuit which does not work satisfactorily when the breakdown voltage approaches 0.3 V. Therefore, protection of TMR elements whose breakdown voltage is as low as 0.3 V requires a protective circuit which works accurately at a desired clamping voltage. Moreover, arranging a TMR element and a clamp circuit on a single AlTiC slider is disadvantageous from the standpoint of technology, performance, and production cost.

It is a feature of the present invention to provide a magnetic head of magnetoresistance effect type which has a magnetoresistive element and an overvoltage protective circuit therefor arranged together on a slider.

It is another feature of the present invention to provide a process for producing a magnetic head of magnetoresistance effect type which has a magnetoresistive element and an overvoltage protective circuit therefor arranged together on a slider.

The first feature mentioned above is achieved by a magnetic head of magnetoresistance effect type which comprises a slider formed from silicon, an insulating layer formed on the slider, a read head having a magnetoresistive element formed on the insulating layer, and an overvoltage protective circuit for the magnetoresistive element formed on the insulating layer.

In some embodiments, the insulating layer is an $SiO_2$ layer. The magnetoresistive element is a TMR (Tunneling Magnetoresistive) element. The protective circuit is a clamp circuit including Schottky diodes connected to both terminals of the magnetoresistive element. The protective circuit includes two Schottky diodes connected in parallel in two directions to the magnetoresistive element. The protective circuit includes field effect transistors connected in parallel to the magnetoresistive element. The magnetoresistive element is a TMR (Tunneling Magnetoresistive) element and the protective circuit is a clamp circuit including Schottky diodes connected to both terminals of the TMR element. The magnetoresistive element is a TMR (Tunneling Magnetoresistive) element and the protective circuit includes field effect transistors connected in parallel to the TMR element.

The first feature mentioned above can also be achieved by a magnetic head of magnetoresistance effect type which comprises a slider formed from silicon, an insulating layer formed on side of the slider, a read head having a magnetoresistive element formed on the insulating layer, a write head formed on the upper part of the read head, and a protective circuit to protect the magnetoresistive element from overvoltage, the protective circuit being formed along the magnetoresistive element.

In some embodiments, the insulating layer is an $SiO_2$ layer. The magnetoresistive element is a TMR (Tunneling Magnetoresistive) element. The protective circuit is a clamp circuit including Schottky diodes connected to both terminals of the magnetoresistive element. The protective circuit includes two Schottky diodes connected in parallel in two directions to the magnetoresistive element. The magnetoresistive element is a TMR (Tunneling Magnetoresistive) element, the write head is an inductive head and the protective circuit is a clamp circuit including Schottky diodes connected to both terminals of the TMR element. The protective circuit includes field effect transistors connected in parallel to the magnetoresistive element. The magnetoresistive element is a TMR (Tunneling Magnetoresistive) element and the protective circuit includes two Schottky diodes connected in parallel in two directions to the TMR element. The magnetoresistive element is a TMR (Tunneling Magnetoresistive) element and the protective circuit includes field effect transistors connected in parallel to the TMR element.

The second feature mentioned above is achieved by a process for producing a magnetic head of magnetoresistance effect type. The process comprises providing a substrate having an insulating layer on one side of silicon wafer; forming a first wiring on the insulating layer; forming an Si layer on part of the insulating layer; forming on the Si layer a clamp circuit including Schottky diodes; forming wiring for the clamp circuit; forming on the insulating layer a magnetoresistive element adjacent to the clamp circuit; and connecting the magnetoresistive element and the clamp circuit to the first wiring.

In some embodiments, the insulating layer is an $SiO_2$ layer. The magnetoresistive element is a TMR (Tunneling Magnetoresistive) element and a write head is laminated on the upper part of the TMR element.

The second feature mentioned above can also be achieved by a process for producing a magnetic head of magnetoresistance effect type. The process comprises providing a substrate having an insulating layer on one side of silicon wafer; forming a first wiring on the insulating layer; forming an Si layer on part of the insulting layer; forming on the Si layer a shunt circuit including field effect transistors each having a source, gate, and drain; forming wiring for the shunt circuit; forming on the insulating layer a magnetoresistive element adjacent to the shunt circuit; and connecting the magnetoresistive element and the shunt circuit to the first wiring.

The insulating layer is an $SiO_2$ layer. The magnetoresistive element is a TMR (Tunneling Magnetoresistive) element and a write head is laminated on the upper part of the TMR element.

Embodiments of the present invention permit a magnetoresistive element and an overvoltage protective circuit therefor to be arranged together on a slider.

DETAILED DESCRIPTION OF THE INVENTION

Figure 4:
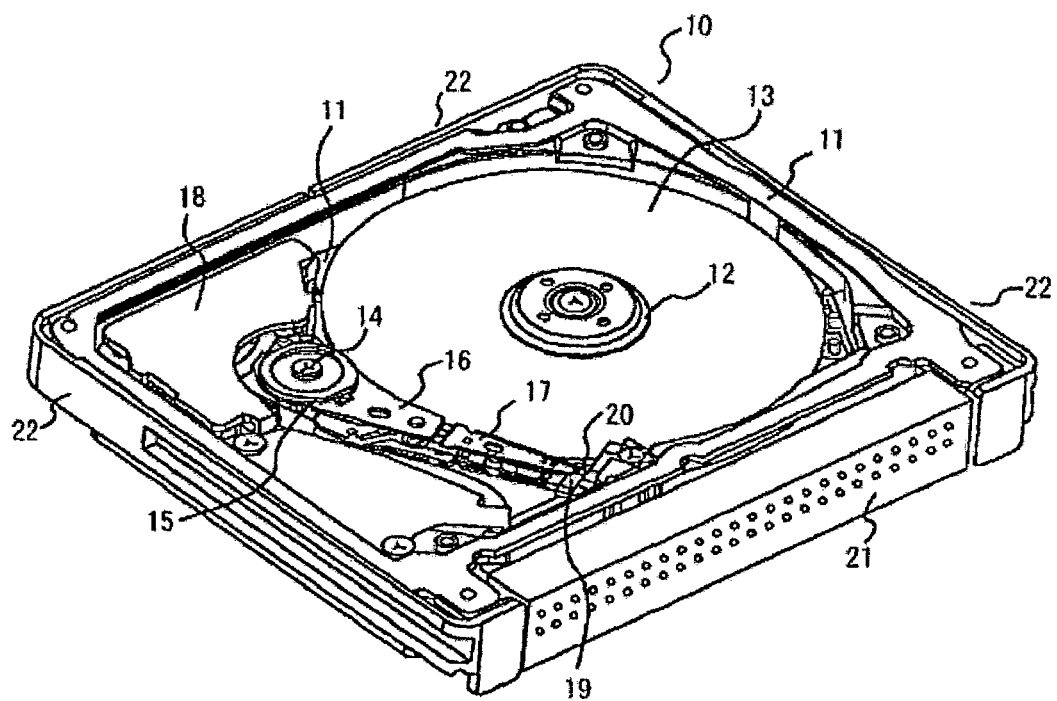
FIG. 4 is a perspective view showing a magnetic disk drive provided with a magnetic head assembly having the magnetic head of magnetoresistance effect type in one embodiment of the present invention.

FIG. 4 shows a magnetic disk drive 10 in which is used the TMR head (Tunneling Magnetoresistive Head) embodied in an embodiment of the present invention. The magnetic disk drive 10 includes a boxy base 11, a spindle motor (not shown) fixed thereto, a magnetic disk 13 which is attached to and turned together with the spindle 12 of the spindle motor, and a pivot 14 fixed to the base 11. The pivot 14 rotatably supports an actuator 15, which has an arm 16 to which a suspension 17 is attached. The suspension 17 has the TMR head 20 attached to the tip thereof through a gimbal (not shown). These arm 16, suspension 17, gimbal, and TMR head 20 constitute a mechanism called magnetic head assembly.

To the other end of the actuator 15 is attached a coil (not shown), which, in combination with a magnetic circuit (not shown) fixed to the base 11, constitutes a voice coil motor (VCM) 18. VCM 18 rotates and drives the actuator 15 around the pivot 14. The actuator 15 turns to make the TMR head 20 move in the radial direction of the magnetic disk 13 to the desired recording track of the magnetic disk 13. The base 11 is provided with a ramp mechanism 19 on which the TMR head rests when it retracts from the magnetic disk 13. The base 11 has on its side a connector 21 for interface with external units. The other sides of the base 11 are surrounded by a frame bumper 22 which protects the constituents from external shocks.

Figure 3:
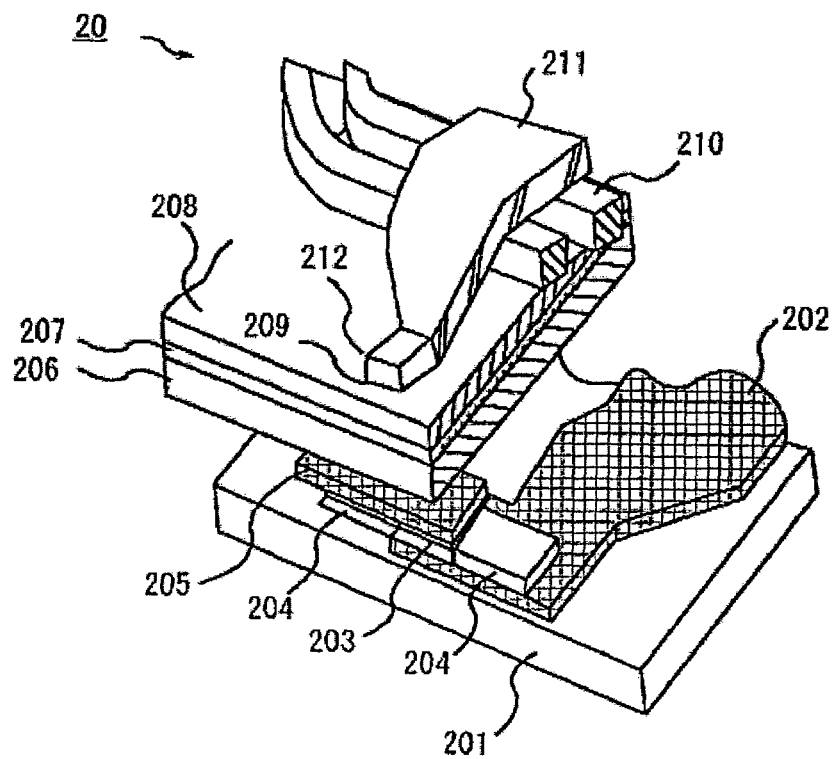
FIG. 3 is a perspective view of the TMR head in one embodiment of the present invention.

FIG. 3 is a perspective view of the TMR head 20 embodied in the present embodiment as viewed from the flying surface. The TMR head 20 includes a slider (not shown), a lower magnetic shield layer 201 formed thereon, a nonmagnetic conductive metal film 202 formed thereon which functions as a lower electrode, and a TMR element 203 composed of an antiferromagnetic layer, a pinned magnetic layer, a barrier layer, and a free layer which are sequentially laminated on top of the other. The TMR element 203 has high-resistance soft magnetic film 204 formed at both ends thereof. On the TMR element 203 and one of the high-resistance soft magnetic film 204 is selectively laminated a nonmagnetic conductive film 205 which serves as an upper electrode. The nonmagnetic conductive metal films 202 and 205, which are impermeable to magnetic flux, constitute a read gap. Adjacent to the high-resistance soft magnetic film 204 and the nonmagnetic conductive film 205 is formed an upper magnetic shield layer 206.

The TMR element 203 incorporated into the above-mentioned system functions as a read head which, when a sensing current is applied across the lower electrode 202 and the upper electrode 205 in the direction perpendicular to the film surface, detects the resistance change as electric signals which takes place in the TMR element 203 in response to the strength of external magnetic field.

On the upper magnetic shield layer 206 is formed, with an insulating separating layer 207 placed thereunder, an inductive magnetic head (write head) for recording. The write head includes a lower magnetic layer 208 and an upper magnetic layer 211 (both constituting a magnetic circuit) formed on the separating layer 207, an upper magnetic pole tip 212 formed at the end of the upper magnetic layer 211, and a magnetic gap 209 formed between the lower magnetic layer 208 and the upper magnetic pole tip 212 of the upper magnetic layer 211. The lower magnetic layer 208 and the upper magnetic layer 211 are magnetically connected to each other behind (not shown) so that they constitute a magnetic circuit having the magnetic gap 209 at its end. In addition, a conducting coil 210 is formed between the lower magnetic layer 208 and the upper magnetic layer 211 with an insulating layer interposed between them.

Figure 2:
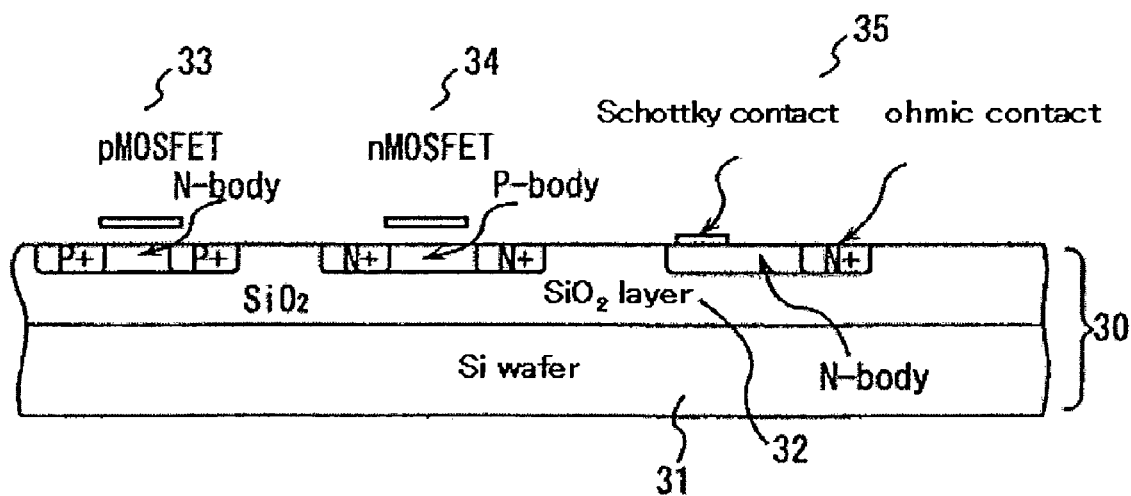
FIG. 2 is a sectional view showing the overvoltage protective circuit formed on the slider (Si wafer) in one embodiment of the present invention.

FIG. 2 shows an overvoltage protective circuit embodied in the present embodiment, which is formed on a silicon slider 31. On the silicon wafer is an SOI (Silicon on Insulator) 30 as a substrate. (The SOI substrate 30 is an $SiO_2$ layer 32 formed by oxidizing the surface of the silicon wafer 31.) On the $SiO_2$ layer 32 are formed an overvoltage protective circuit to protect the magnetoresistive element (not shown) from overvoltage, together with a preamplifier for the read-write circuit (not shown). The overvoltage protective circuit includes a field effect transistor (PMOSFET) 33, a field effect transistor (nMOSFET) 34, and a Schottky diode 35. The pMOSFET 33 is formed by reducing the $SiO_2$ layer 32 into an Si semiconductor layer (N-body). The (rtMOSFET) 34 is formed by reducing the $SiO_2$ layer 32 into an Si semiconductor layer (P-body). Alternatively, the Si semiconductor layer may be formed by epitaxial growth on the $SiO_2$ layer 32, and the three electrodes of source, gate, and drain are formed later. The Schottky diode 35 may be formed from the Si semiconductor layer (N-body) formed as mentioned above and a Schottky contact (metal) in contact therewith. The metal should preferably be titanium so that the Schottky diode 35 has a voltage drop of 0.3 V in the forward direction. Incidentally, in the above-mentioned embodiment, the $SiO_2$ layer is formed by oxidizing the surface of the SOI substrate(or silicon wafer); however, the $SiO_2$ layer may be replaced by any other adequate insulating layer formed on the silicon wafer.

Figure 1:
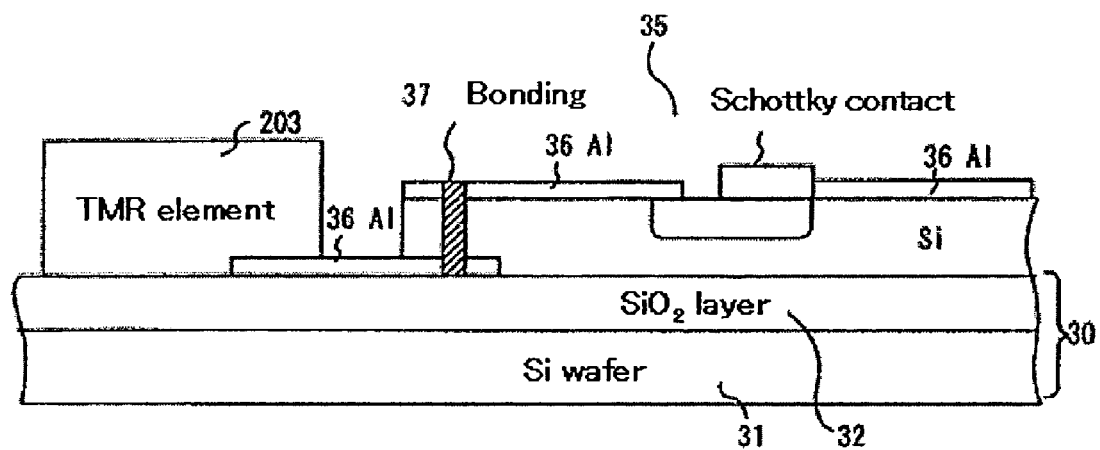
FIG. 1 is a partial sectional view showing the slider of the magnetic head of magnetoresistance effect type and the overvoltage protective circuit in one embodiment of the present invention.

FIG. 1 shows a part of the TMR element 203 which is formed, together with an ESD protective circuit (Schottky diode) 35, on the SOI substrate 30. The Schottky diode 35 and aluminum wiring 36 are formed first on the SOI substrate so that the TMR element 203 is not affected by heat applied to form the Schottky diode 35. After that, the TMR element 203 is formed as mentioned above. Connection between the Schottky diode 35 and the TMR element 203 is accomplished by soldering or ultrasonic bonding 37. Therefore, this embodiment of the present invention offers the advantage that the TMR element 203 is not affected by high temperatures (about 400° C.) involved in the aluminum wiring process.

The embodiment shown in FIG. 1 permits the TMR element 203 and the Schottky diode 35 (as the protective circuit) to be arranged horizontally on the SOI substrate 30. However, it may be modified such that the TMR element 203 and the protective circuit 35 are arranged vertically.

Figure 5:
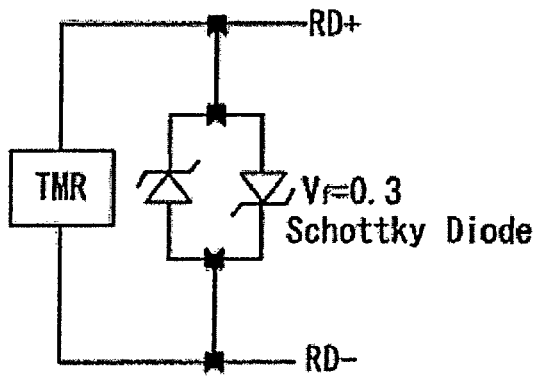
FIG. 5 is a circuit diagram of a clamp circuit with a Schottky diode.

FIGS. 5 to 7 show some examples of the overvoltage protective circuits 33, 34, and 35. FIG. 5 shows a clamp circuit in which Schottky diodes are connected parallel in two directions to the ends (RD+ and RD−) of the TMR element. The Schottky diode has a voltage drop (Vf) of 0.3 V in the forward direction.

Figure 6A:
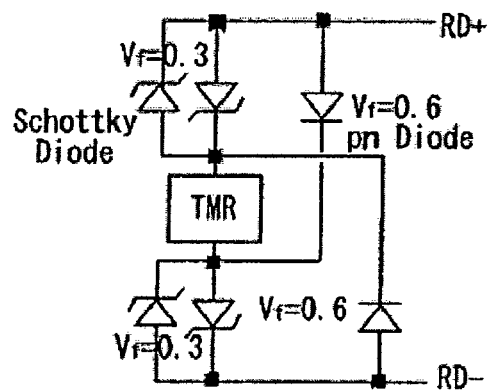
FIG. 6A is a circuit diagram of one example of clamp circuits with temperature compensation taken into account.
Figure 6B:
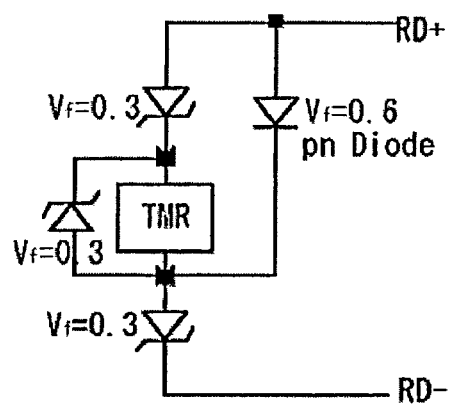
FIG. 6B is a circuit diagram of one example of clamp circuits with temperature compensation taken into account.
Figure 6C:
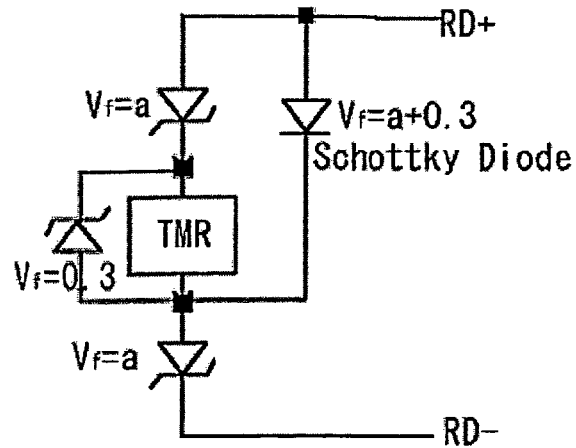
FIG. 6C is a circuit diagram of-one example of clamp circuits with temperature compensation taken into account.

FIGS. 6A to 6C show some examples of circuits to keep Vf constant over a broad temperature range by temperature compensation. The circuit shown in FIG. 6A is designed to protect the TMR element at voltages greater than 0.3 V which is the difference between a pn-junction diode (Vf=0.6 V) and a Schottky diode (Vf=0.3 V). The fact that they have similar temperature coefficients is utilized to cancel their temperature characteristics when the ambient temperature changes. Two identical circuits are connected in two directions so that the desired effect is produced when either of a positive or negative pulse is applied to the terminal RD+ or RD−.

The circuit shown in FIG. 6B has Schottky diodes connected in parallel to the TMR element in the backward bias direction. It produces the same effect as that shown in FIG. 5 which has also Schottky diodes in the backward bias direction. It does not interfere with normal operation so long as Vf is 0.3 V at low temperatures and Vf does not become negative at high temperatures.

The circuit shown in FIG. 6C is different from those shown above in that the pn-junction diode is replaced by a Schottky diode. This circuit offers the advantage that any metal is selected freely so that the resulting Schottky diode has a voltage difference (Vf) of 0.3 V. Moreover, it produces a better effect than those shown above in cancellation of temperature characteristics because it employs Schottky diodes of the same type.

Figure 7A:
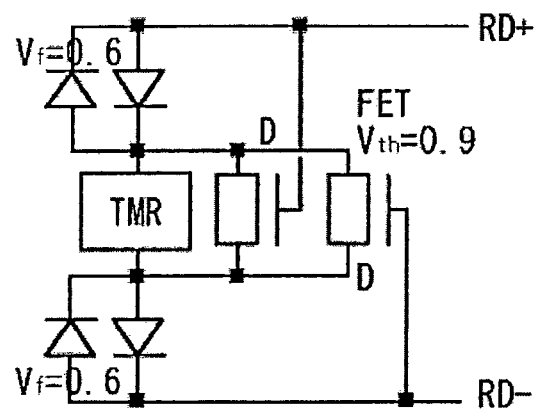
FIG. 7A is a circuit diagram showing one example of the overvoltage protective circuit with field effect transistors.

FIGS. 7A to 7D show some examples of circuits to shunt both terminals of the TMR element by means of one or two field effect transistors (nMOSFET) having a slightly high gate voltage. The circuit shown in FIG. 7A is designed to shunt both terminals of the TMR element at high speeds owing to an increase in the gate voltage by 0.6 V equivalent to Vf of the pn-junction diode. This provision is necessary because the source-follower (circuit to connect drain and gate, thereby skipping the diode) loses speed (due to rise in on-resistance) when the source voltage and gate voltage (=drain voltage) approach Vth (0.9 V) of the FET on-voltage during shunting.

Figure 7B:
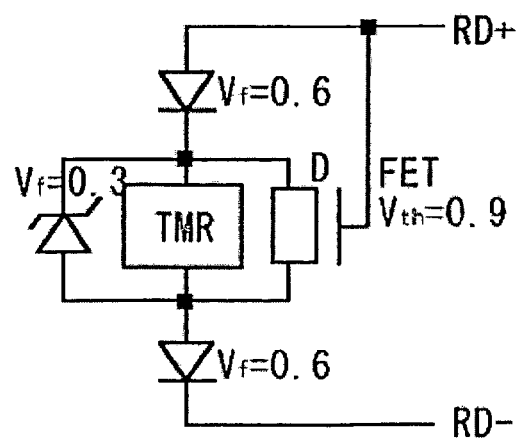
FIG. 7B is a circuit diagram showing one example of the overvoltage protective circuit with field effect transistors.

The circuit shown in FIG. 7B is similar to that shown in FIG. 6B, except that it has a simplified protective circuit which works when a positive ESD pulse is applied to RD− or a negative ESD pulse is applied to RD+. However, the temperature characteristic of the diode does not matter because the bias direction is opposite to the ordinary one.

Figure 7C:
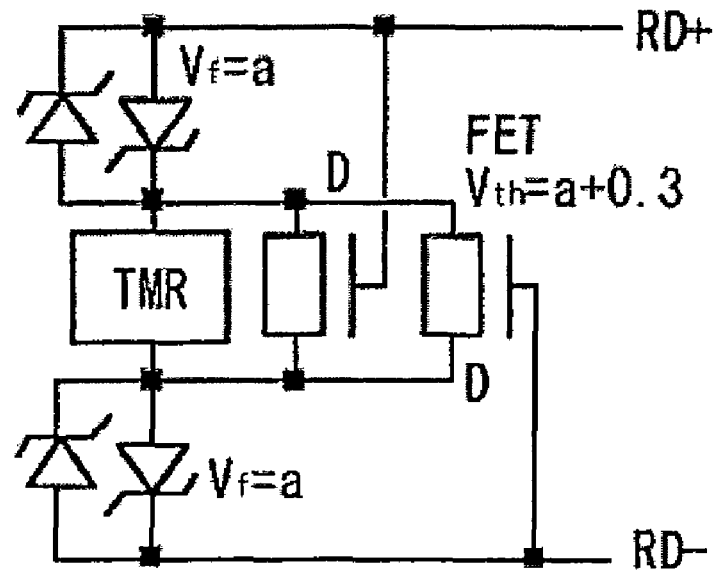
FIG. 7C is a circuit diagram showing one example of the overvoltage protective circuit with field effect transistors.

The circuit shown in FIG. 7C differs from that shown in FIG. 7A in that the pn-junction diodes are replaced by Schottky diodes. It permits the resistance (on-resistance) of shunting to be changed according to the aimed value of bias voltage or the amount of over drive (corresponding to Vf) of the gate voltage.

Figure 7D:
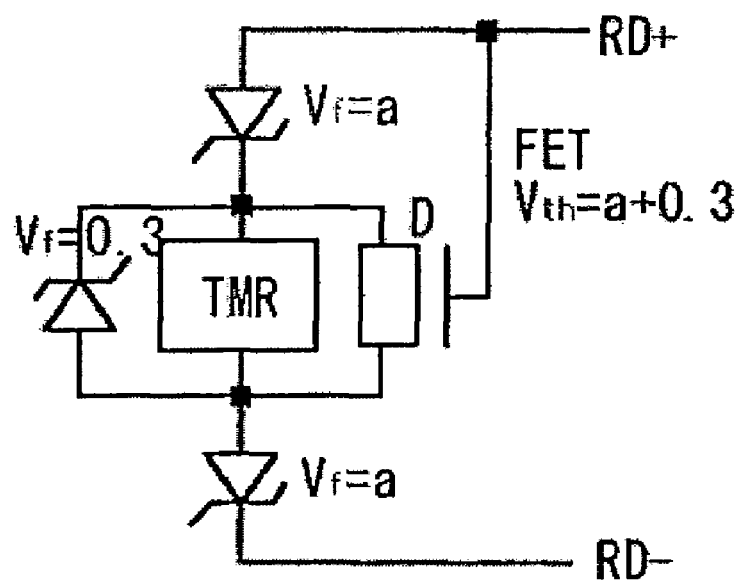
FIG. 7D is a circuit diagram showing one example of the overvoltage protective circuit with field effect transistors.

The circuit shown in FIG. 7D is similar to those shown in FIGS. 6B and 7B, except that it has a simplified protective circuit which works when a positive ESD pulse is applied to RD− or a negative ESD pulse is applied to RD+. However, the temperature characteristic of the diode does not matter because the bias direction is opposite to the ordinary one.

In the above-mentioned embodiment, the TMR element is used as the magnetoresistive element; however, it may be replaced by a GMR element or an MR element, as a matter of course.

The above-mentioned embodiment of the present invention makes it possible to arrange a magnetoresistive element and an overvoltage protective circuit (ESD protective circuit) side by side on the slider. Moreover, it also makes it possible to place the ESD protective circuit closer to the magnetoresistive element than the preamplifier (or to place the point for clamping closer to the magnetoresistive element). This produces the effect of reducing the wiring length between the magnetoresistive element and the ESD protective circuit. This in turn makes it possible to accurately establish the clamping voltage at a desired value without being affected by the inductance of wiring. Moreover, since the ESD circuit is electrically isolated from the slider and each circuit is surrounded by $SiO_2$, there is no possibility that static charge generated in the slider and each circuit flows into the ESD protective circuit through the wiring. This eliminates the limitation of potential when diodes are used. Moreover, the fact that there is no junction point with the Si wafer near the N layer contributes to low parasitic capacity and high switching operation.

What is claimed is:

1. A magnetic head of magnetoresistance effect type, comprising:
   a slider formed from silicon;
   an insulating layer formed on said slider;
   a read head having a magnetoresistive element formed on and in contact with said insulating layer; and
   an overvoltage protective circuit for said magnetoresistive element formed on said insulating layer and along the same horizontal plane as said magnetoresistive element;
   wherein the overvoltage protective circuit includes a metal contact and wiring for connection to the magnetoresistive element.

2. A magnetic head of magnetoresistance effect type according to claim 1, wherein said insulating layer is an $SiO_2$ layer.

3. A magnetic head of magnetoresistance effect type according to claim 1, wherein said magnetoresistive element is a TMR (Tunneling Magnetoresistive) element.

4. A magnetic head of magnetoresistance effect type according to claim 1, wherein said protective circuit is a clamp circuit including Schottky diodes connected to both terminals of said magnetoresistive element.

5. A magnetic head of magnetoresistance effect type according to claim 1, wherein said protective circuit includes two Schottky diodes connected in parallel in two directions to said magnetoresistive element.

6. A magnetic head of magnetoresistance effect type according to claim 1, wherein said protective circuit includes field effect transistors connected in parallel to said magnetoresistive element.

7. A magnetic head of magnetoresistance effect type according to claim 1, wherein said magnetoresistive element is a TMR (Tunneling Magnetoresistive) element and said protective circuit is a clamp circuit including Schottky diodes connected to both terminals of said TMR element.

8. A magnetic head of magnetoresistance effect type according to claim 1, wherein said magnetoresistive element is a TMR (Tunneling Magnetoresistive) element and said protective circuit includes field effect transistors connected in parallel to said TMR element.

9. A magnetic head of magnetoresistance effect type, comprising:
   a slider formed from silicon;
   an insulating layer formed on side of said slider;
   a read head having a magnetoresistive element formed on and in contact with said insulating layer;
   a write head formed on the upper part of said read head; and
   a protective circuit to protect said magnetoresistive element from overvoltage, said protective circuit being formed over said insulating layer and along the same horizontal plane as said magnetoresistive element;
   wherein the overvoltage protective circuit includes a metal contact and wiring for connection to the magnetoresistive element.

10. A magnetic head of magnetoresistance effect type according to claim 9, wherein said insulating layer is an $SiO_2$ layer.

11. A magnetic head of magnetoresistance effect type according to claim 9, wherein said magnetoresistive element is a TMR (Tunneling Magnetoresistive) element.

12. A magnetic head of magnetoresistance effect type according to claim 9, wherein said protective circuit is a clamp circuit including Schottky diodes connected to both terminals of said magnetoresistive element.

13. A magnetic head of magnetoresistance effect type according to claim 9, wherein said protective circuit includes two Schottky diodes connected in parallel in two directions to said magnetoresistive element.

14. A magnetic head of magnetoresistance effect type according to claim 9, wherein said magnetoresistive element is a TMR (Tunneling Magnetoresistive) element, said write head is an inductive head and said protective circuit is a clamp circuit including Schottky diodes connected to both terminals of said TMR element.

15. A magnetic head of magnetoresistance effect type according to claim 9, wherein said protective circuit includes field effect transistors connected in parallel to said magnetoresistive element.

16. A magnetic head of magnetoresistance effect type according to claim 9, wherein said magnetoresistive element is a TMR (Tunneling Magnetoresistive) element and said protective circuit includes two Schottky diodes connected in parallel in two directions to said TMR element.

17. A magnetic head of magnetoresistance effect type according to claim 9, wherein said magnetoresistive element is a TMR (Tunneling Magnetoresistive) element and said protective circuit includes field effect transistors connected in parallel to said TMR element.

18. A process for producing a magnetic head of magnetoresistance effect type, comprising:
   a step of providing a substrate having an insulating layer on one side of silicon wafer;
   a step of forming a first wiring on said insulating layer;
   a step of forming an Si layer on part of said insulating layer;
   a step of forming on said Si layer a clamp circuit including Schottky diodes;
   a step of forming wiring for said clamp circuit;
   a step of forming on said insulating layer a magnetoresistive element along the same horizontal plane as said clamp circuit; and
   a step of connecting said magnetoresistive element and said clamp circuit to said first wiring.

19. A process for producing a magnetic head of magnetoresistance effect type according to claim 18, wherein said insulating layer is an $SiO_2$ layer.

20. A process for producing a magnetic head of magnetoresistance effect type according to claim 18, wherein said magnetoresistive element is a TMR (Tunneling Magnetoresistive) element and a write head is laminated on the upper part of said TMR element.

21. A process for producing a magnetic head of magnetoresistance effect type, comprising:
   a step of providing a substrate having an insulating layer on one side of silicon wafer;
   a step of forming a first wiring on said insulating layer;
   a step of forming an Si layer on part of said insulting layer;
   a step of forming on said Si layer a shunt circuit including field effect transistors each having a source, gate, and drain;
   a step of forming wiring for said shunt circuit;
   a step of forming on said insulating layer a magnetoresistive element on the same horizontal plane as said shunt circuit; and
   a step of connecting said magnetoresistive element and said shunt circuit to said first wiring.

22. A process for producing a magnetic head of magnetoresistance effect type according to claim 21, wherein said insulating layer is an $SiO_2$ layer.

23. A process for producing a magnetic head of magnetoresistance effect type according to claim 21, wherein said magnetoresistive element is a TMR (Tunneling Magnetoresistive) element and a write head is laminated on the upper part of said TMR element.

* * * * *